United States Patent [19]

Ohara et al.

[11] 4,371,594

[45] Feb. 1, 1983

[54] BATTERY ACCOMMODATING DEVICE

[75] Inventors: Tsunemasa Ohara, Tokyo; Masayoshi Yamamichi, Kawasaki, both of Japan

[73] Assignee: Canon Kabushiki Kaisha, Tokyo, Japan

[21] Appl. No.: 306,770

[22] Filed: Sep. 29, 1981

[30] Foreign Application Priority Data

Oct. 3, 1980 [JP] Japan .................. 55-141809[U]
Oct. 3, 1980 [JP] Japan .................. 55-141810[U]

[51] Int. Cl.³ ............................................. H01M 2/10
[52] U.S. Cl. ................................................. 429/97; 429/99
[58] Field of Search ............... 429/97, 96, 98, 99, 429/100, 175, 176, 177; 206/333; 58/23 BA

[56] References Cited

U.S. PATENT DOCUMENTS

| 4,146,682 | 3/1979 | Nakao | 429/97 |
| 4,160,857 | 7/1979 | Nordella et al. | 429/97 |
| 4,218,522 | 8/1980 | Motoyoshi | 429/97 |
| 4,230,777 | 10/1980 | Gatto | 429/97 |
| 4,269,908 | 5/1981 | Stemme | 429/99 X |

Primary Examiner—Charles F. LeFevour
Attorney, Agent, or Firm—Toren, McGeady and Stanger

[57] ABSTRACT

A battery accommodating device comprising a chamber configured to accommodate a plurality of cylindrical batteries in side-by-side relation, and a cover hinged to open and close an opening of the chamber. With the above-described cylindrical batteries loaded in the above-described chamber, there is a space surrounded by the side walls of the batteries and the inside wall of the chamber in which a lock member for holding the cover in the closed position is provided so as to be operable from the outside of the battery chamber.

5 Claims, 7 Drawing Figures

BATTERY ACCOMMODATING DEVICE

BACKGROUND OF THE INVENTION

1. Field of the Invention

This invention relates to battery accommodating devices for use in cameras and other small size instruments and, more particularly, to battery accommodating devices with a cover for the opening of the battery chamber being pivotally supported near the battery chamber.

2. Description of the Prior Art

When a plurality of cylindrical batteries are to be incorporated within the case of an instrument of small size such as a camera, since the instrument body itself is small as compared with the required bulk and size of the battery accommodating device, a very serious problem arises as to how compact the configuration of the battery accommodating device can be made. In this connection, it should be noted that the degree of compactness of the battery accommodating device largely depends upon what form is assumed by the opening and closing mechanism of the cover provided on the opening portion of the battery accommodating device. For this reason, for such small size instruments in the past, there have been proposed a wide variety of opening and closing mechanisms for the cover in an attempt to obtain a more compact battery accommodating device.

As shown in FIG. 1, for example, the cover is constructed in the form of a slide plate 2 which is slidingly moved when being attached to and detached from the camera body 1. In another example shown in FIG. 2, the cover 5 is made of an elastic material such as synthetic resin and is provided with a resilient portion 5a near the pivoted side thereof, the opposite side of which is provided with a lock pawl 5b. Thus, the cover 5 is releasably locked in the closed position for the opening portion of the battery chamber 4 formed within the casing 3 of the instrument.

Certainly, the use of such configuration as shown in FIG. 1 or 2 leads to the provision of a compact and simple battery accommodating device. With the device of FIG. 1, however, since the cover 2 is removed from the instrument body 1 when the batteries are exchanged, there is some possibility of losing or misplacing the cover. Also, with the device of FIG. 2, when opening the cover 5, the operator must first release the cover 5 from the locking connection at the pawl 5b by pushing the cover 5 in the direction indicated by arrow A, while putting his fingernail in the recessed portion 5c and then raising up the cover 5 until the chamber is fully open. Thus, the handling of the cover 5 is very difficult to perform.

On the other hand, it is known in the art to provide a device of the construction as shown in FIG. 3 which overcomes the above-described handling difficulty. That is, formed within the instrument casing 6, is a battery chamber 7 with a cover 8 hinged at one side thereof through a spring 9, the opposite side of which is formed to a pawl 8a. This pawl 8a is made to cooperate with a lock member 10 which is constructed in isolation from the cover 8. This lock member 10 is urged by a spring 11 in a direction to bring the lock pawl 10a into engagement with the detent pawl 8a of the cover 8. As the locking is normally held, in releasing the cover 8 from the locking connection, the operator needs only to slidingly move the lock member 10 against the force of the bias spring 11. Then, the cover 8 is automatically opened by the power stored in the spring 9.

With such construction, it is possible that, unlike those arrangements of FIGS. 1 and 2, the loss of the cover is not encountered when the batteries are exchanged and only one touch is sufficient to effect opening of the cover. However, the device of FIG. 3 has a disadvantage that, besides the space which the battery chamber occupies, there must be created an additional space which the lock member 10 is intended to occupy and in which the lock member 10 can move. This takes away from achieving minimization of the bulk and size of the battery accommodating device.

SUMMARY OF THE INVENTION

With the foregoing in mind, it is an object of the present invention to provide a battery accommodating device for use in a small-sized instrument such as a camera requiring a plurality of batteries of cylindrical shape, which device is excellent in handling characteristics and compact in form. To achieve this object, a novel opening and closing mechanism for the cover is configured so as to effectively utilize a gap unavoidably created from the side-by-side positioning of the batteries.

In accordance with the invention, in a battery accommodating device having a chamber in which a plurality of cylindrical batteries are positioned in side-by-side relation to each other and a cover pivotally supported and arranged to close an opening portion of the chamber, the improvement comprises a lock member for locking the cover in the closed position, the lock member being provided in a space surrounded by the side walls of the cylindrical batteries, when loaded in the chamber, and an inside wall of the chamber, and also an operating member for operating the lock member from the outside of the battery chamber.

For a better understanding of the present invention, reference is made to the following description of the drawings, while the scope of the present invention will be pointed out by the appended claims.

DETAILED DESCRIPTION OF THE PREFERRED EMBODIMENT

Figure 4:
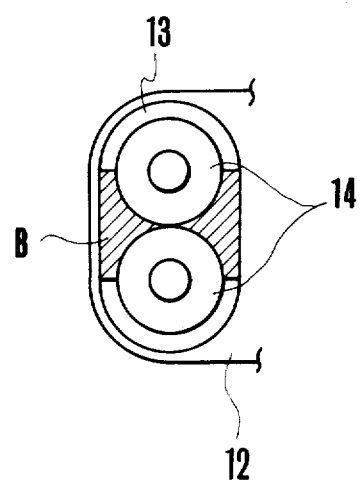
FIG. 4 is a plan view illustrating the formation of a spare space in the battery chamber.
Figure 5:
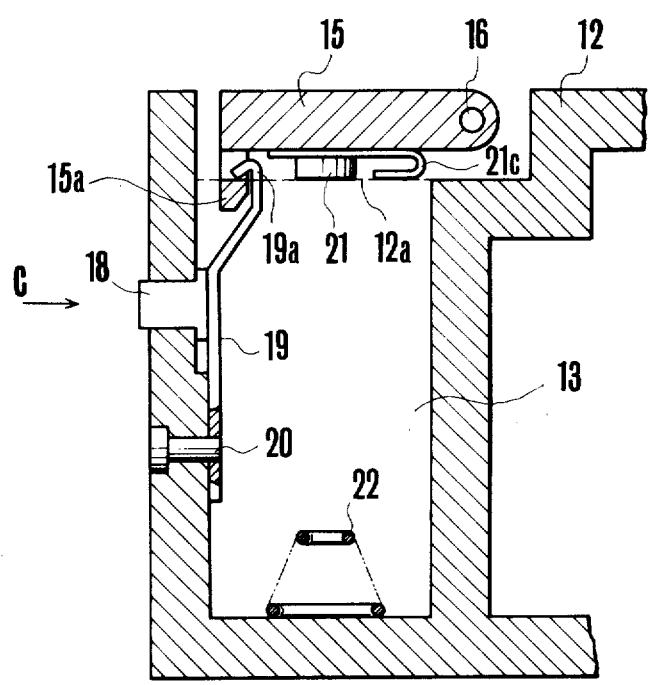
FIGS. 5 and 6 are sectional views of an embodiment of a battery accommodating device according to the present invention in the closed and open positions, respectively.
Figure 7:
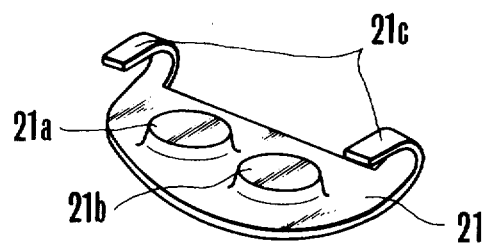
FIG. 7 is a perspective view of the battery contact of FIGS. 5 and 6.

In FIG. 5, element 12 is a housing of an instrument such as a camera. Formed within this instrument housing is a battery chamber 13 which accommodates two batteries 14 as shown in FIG. 4. This battery chamber 13 is provided with helical springs 22 on the bottom panel thereof to press the batteries 14 against a contact piece 21 which is provided on the inner side of a cover 15. This cover 15 is arranged to be rotatable about a pivot pin 16 so that an opening portion of the battery chamber 13 is opened and closed, and is provided with an engagement portion 15a formed at the opposite or free end thereof. The above-described battery contact piece 21 is formed with a flat plate embossed to produce electrodes 21a and 21b, and its two extensions 21c are bent so as to have a spring action as shown in FIG. 7. The extensions 21c, when pressed against an opening edge 12a of the instrument housing 12, urge the cover 15 to open.

Element 19 is a hook member made of an elastic material. This hook member 19 is positioned in a spare space B of FIG. 4 (resulting from the positioning of a plurality of cylindrical batteries in side-by-side relation to each other and defined by the side walls of the adjacent two batteries and the confronting flat inner wall of the battery chamber 13). Formed in one end of the hook member 19, is a pawled portion 19a cooperative with a detent portion 15a of the cover 15. The opposite end of hook member 19 is fixedly secured to the instrument housing by a screw fastener 20. The engagement of the pawled portion 19a of the hook member 19 in the detent portion 15a of the cover 15 is adjusted so as to be released without causing the hook member to contact with any one of the batteries 14 in the chamber 13 when a knob 18 is pushed in a direction indicated by arrow C.

Figure 6:
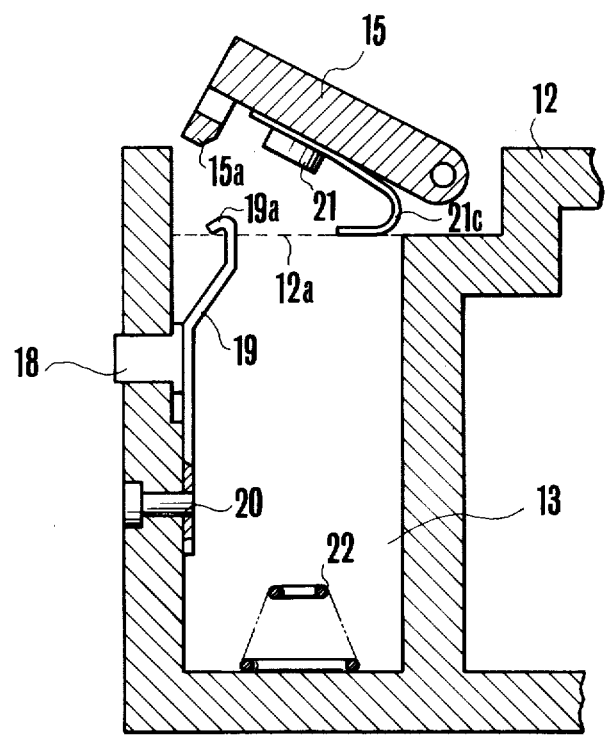

The operation of the battery accommodating device of such construction is as follows: In exchanging old batteries with new ones, with the device assumed to be in the closed position of FIG. 5 (although the batteries are not shown), the operator will push the knob 18 toward the inside or in the direction indicated by arrow C. As a consequence, as has been mentioned above, the hook member 19 yields to take the pawled portion 19a out of engagement with the detent portion 15a of the cover 15. Then, the cover 15 is automatically opened under the action of the resilient portion 21c of the battery contact piece 21, taking the position illustrated in FIG. 6. Then, the batteries (not shown) are popped out of the opening of the chamber 13 by the action of the springs 22. The operator will then remove the batteries from the chamber 13, and insert new ones into the empty chamber 13. After that, when the cover is turned about the pivot pin 16 against the bias force of the resilient extensions 21c of the battery contact piece 21, and is then pressed against the opening portion of the chamber 13, the cover 15 is locked in the closed position as the detent portion 15a of the cover 15 is engaged against the pawl 19a of the hook member 19.

As has been explained in detail above, the present invention concerns the type of battery accommodating device in which a plurality of cylindrical batteries are positioned in side-by-side relation to each other in a chamber, and the cover for the opening portion of this chamber is pivotally supported, and contemplates the use of a space surrounded by the side walls of the adjacent two batteries and the confronting inside wall of the chamber in arranging a lock member for the cover. Another feature of the invention is that the resilient force of this lock member is utilized in controlling the locking and release of the cover. Therefore, a battery accommodating device having excellent characteristics can be advantageously constructed in so compact a form that the device is well suited in an instrument of small size such as a camera.

Figure 1:
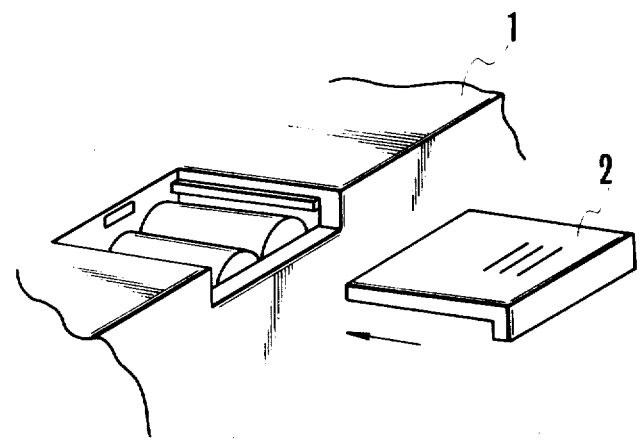
FIG. 1 is a perspective view of an example of a conventional battery accommodating device.
Figure 2:
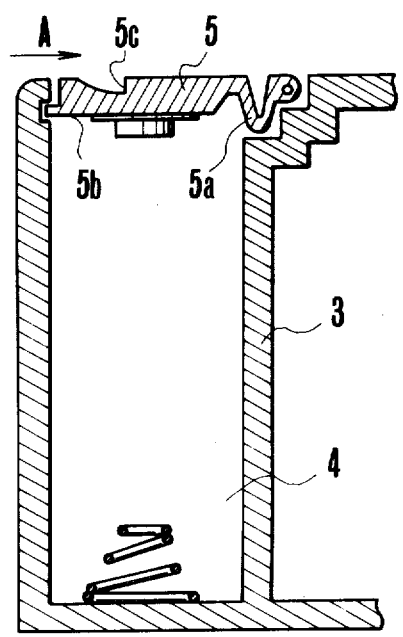
FIGS. 2 and 3 are sectional views of two other examples of the conventional battery accommodating device.
Figure 3:
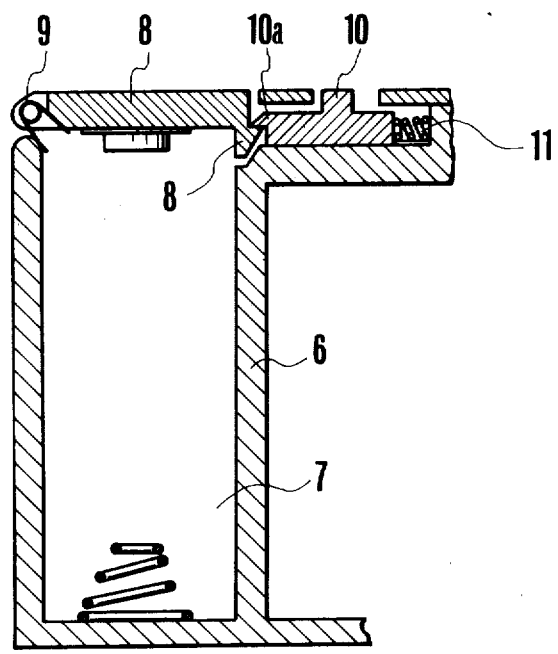

Another advantage of the invention arising from the formation of the end portions of the battery contact piece fixedly mounted on the cover as bent to impart a resilient force thereto is that, for example, as shown in FIG. 3, there is no need to make use of a spring around the pivot shaft at which the cover is supported, and therefore the structure of the battery accommodating device can be simple. Although the embodiment of the invention has been described in connection with the battery contact piece having two end portions, both of which are bent, it is not always necessary to bend both ends, and the use of either one of the end portions in the bending formation suffices to effect an equivalent result.

While the foregoing description and drawings represent the preferred embodiments of the present invention, it will be obvious to those skilled in the art that various changes and modifications may be made therein without departing from the true spirit and scope of the present invention.

What is claimed is:

1. In a battery accommodating device having a chamber in which a plurality of cylindrical batteries are positioned in side-by-side relation to each other and a cover pivotally supported and arranged to close an opening portion of said chamber, the improvement comprising:
    (a) a lock member for locking said cover in the closed position, said lock member being provided in a space surrounded by the side walls of the cylindrical batteries when loaded in said chamber and an inside wall of said chamber; and
    (b) an operating member for operating said lock member from the outside of said battery chamber.

2. In a battery accommodating device having a chamber in which a plurality of cylindrical batteries are positioned in side-by-side relation to each other and a cover pivotally supported and arranged to close an opening portion of said chamber, the improvement comprising:
    (a) an electrically conductive member provided on said cover and arranged to contact with said batteries, end portions of said member being formed to a curved shape so that said cover is urged in a direction to open;
    (b) a lock member for locking said cover in the closed position, said lock member being provided in a space surrounded by the side walls of the cylindrical batteries when loaded in said chamber and the inside wall of said chamber; and
    (c) an operating member for operating said lock member from the outside of said battery chamber.

3. A device according to claim 2, wherein said lock member is formed by an elastic material.

4. A device according to claim 3, wherein said lock member is fixedly secured to the side surface of said battery chamber at one end thereof, the opposite end of which, when moved against the resilient force by actuation of said operating member, releases said cover from the locking connection.

5. A device according to claim 2, wherein said bent end portions of said electrically conductive member are in compressive contact on an opening edge portion of said battery chamber.

* * * * *